United States Patent

Perry et al.

[11] Patent Number: 5,092,527
[45] Date of Patent: Mar. 3, 1992

[54] FLUORESCENT TUBE CRUSHER WITH PARTICULATE SEPARATION AND RECOVERY

[75] Inventors: Timothy J. Perry, Danville; Frederick Bryant, Novato, both of Calif.

[73] Assignee: Mercury Technologies Corporation, Benicia, Calif.

[21] Appl. No.: 458,177

[22] Filed: Dec. 28, 1989

[51] Int. Cl.⁵ .................................................. B02C 19/12
[52] U.S. Cl. .................................... 241/19; 241/24; 241/57; 241/60; 241/99; 241/DIG. 14
[58] Field of Search ................ 241/99, 60, 57, 24, 241/79.1, 18, 19, DIG. 14

[56] References Cited

U.S. PATENT DOCUMENTS

| | | |
|---|---|---|
| 2,185,352 | 1/1940 | Peters . |
| 2,558,255 | 6/1951 | Johnson et al. . |
| 2,593,657 | 4/1952 | Coon et al. . |
| 2,620,988 | 12/1952 | Tellier . |
| 2,628,036 | 2/1953 | Hall . |
| 2,785,767 | 3/1957 | Glidden . |
| 2,866,604 | 12/1958 | Hall . |
| 3,308,609 | 3/1967 | McCulloch et al. . |
| 3,333,777 | 8/1967 | Highfill et al. . |
| 3,353,756 | 11/1967 | Morgenson . |
| 3,889,886 | 6/1975 | Spivey ........................... 241/99 X |
| 3,913,849 | 10/1975 | Atanasoff et al. . |
| 4,037,795 | 7/1977 | Fyfe .............................. 241/79.1 X |
| 4,361,290 | 11/1982 | Francis ........................... 241/57 |
| 4,545,540 | 10/1985 | Nakamura ........................ 241/99 |
| 4,895,642 | 1/1990 | Frei ............................... 241/79.1 X |

Primary Examiner—Mark Rosenbaum
Assistant Examiner—Frances Chin

[57] ABSTRACT

A digesting system for disposal and separation of the component materials, including potentially toxic materials, from used fluorescent tubes, which breaks up fluorescent tubes with a rotating fracture blade while passing a critical amount of stripping air through the fracture zone and countercurrently through a countercurrent flow zone with the fractured glass. The small dust and powder particulates separated from the glass by the countercurrent air stream are then separated from the air stream by a sequence including an initial cyclone or the like from which particulate material collected may be removed during continued operation and by subsequent fine filter means and a final activated carbon filter to remove metallic vapors.

32 Claims, 1 Drawing Sheet

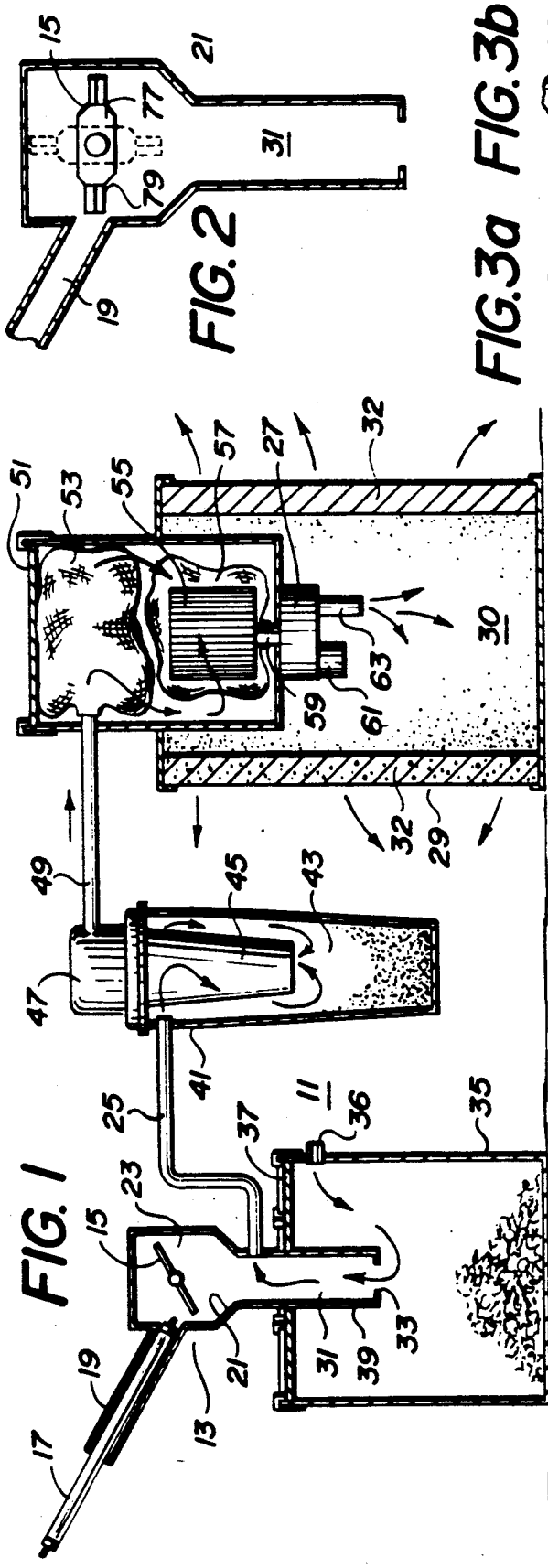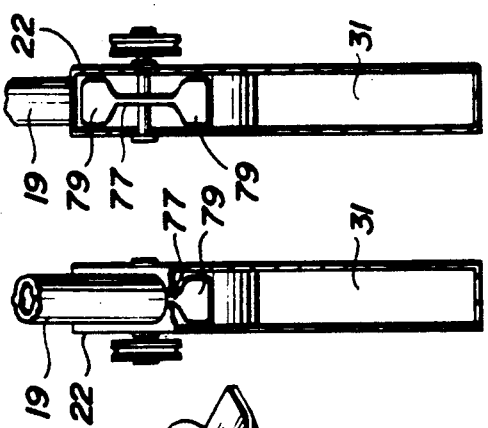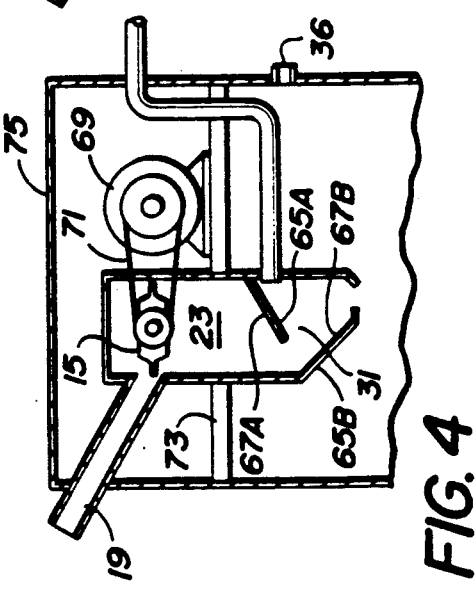

FLUORESCENT TUBE CRUSHER WITH PARTICULATE SEPARATION AND RECOVERY

RELATED APPLICATIONS

This application is related to a concurrently filed application entitled "Improved Fluorescent Tube Crusher with Particulate Separation and Recovery" filed by one of the inventors herein and directed more particularly to the jarring surfaces disclosed in FIGS. 4 and 6 of this application.

BACKGROUND OF THE INVENTION

1. Field of the Invention

The present invention relates to the crushing or digestion of used fluorescent tubes. More particularly, the present invention relates to a combined crushing and separation system in which a clean separation is made between the crushed glass and the potentially toxic fumes and powders contained within the interior of a fluorescent tube.

2. Discussion of the Prior Art.

Fluorescent light tubes are formed from elongated cylindrical or tubular glass receptacles which are charged with mercury or other conductive vapors. The inside surface of the tube is coated with a fluorescent coating of some form such as phosphorus itself or other phosphor powders such as beryllium and cadmium compounds and the like. Mercury vapor as well as beryllium and cadmium are well known as potentially toxic materials as are other phosphor powders with which the inside of a fluorescent tube may be coated. Older fluorescent tubes often used fairly high concentrations of beryllium powders, but fluorescent tubes by cadmium-type powders.

Since fluorescent tubes are in general, bulky and unsatisfactory for disposal without treatment, it has become customary to crush them into small pieces by various means and then dispose of the fractured pieces Merely fracturing the tube itself into small pieces for disposal, however, is not very satisfactory because of the potentially toxic nature of the dust and vapor originally confined inside the fluorescent tube. Such potentially toxic particulates, which occur mostly in the form of small dust particles plus mercury vapor and small drops or beads of mercury, can be quite detrimental if they escape to the environment.

While it might be possible to refurbish burned out fluorescent tubes by removing the metal ends or "tips" from the tubular glass envelope and cleaning the inside followed by recoating the inside of the tube with fluorescent or phosphor powder material, followed by the addition of new tips and recharging with conductive metallic vapor, as a practical matter, the cylindrical glass container itself has little intrinsic value. Furthermore, it is difficult to properly renew the internal fluorescent surface of the tube and difficult to reapply the metallic tips to form an effective seal with the ends of the tube. It is usually more economical, therefore, to manufacture new fluorescent tubes than to refurbish worn out tubes. It has consequently become customary to dispose of the used tubes. However, because of their bulky nature, it is difficult to adequately dispose of the tubes except by crushing to reduce their bulk followed by disposal of the residue in a hazardous material landfill or dumpsite or the like. While it has been recognized the toxic particulates and vapors should be contained somehow, the usual manner of handling the toxic dust and vapor has been either to ignore it or to crush the tubular receptacle while washing by means of a flow or stream of water to prevent the escape of toxic material to the environment Ignoring the toxic materials is no longer either acceptable or possible Wetting down the crushed glass and other materials, on the other hand, creates what can only be referred to as a "soggy mess" which not only is difficult to dispose of, but weight-for-weight has become heavier and even more difficult to dispose of than the original dry material, particularly in view of its toxic nature.

It has long been known to provide apparatus for breaking or crushing glasswear and particularly glass bottles and the like to reduce their bulk and incidentally to prevent their reuse particularly in the case of liquor bottles and the like. Among such apparatus may be mentioned the following:

U.S. Pat. No. 2,185,352 issued Jan. 2, 1940 to C. F. Peters discloses an inclined chute leading into a glass receptacle. A foot operated hammer is arranged to strike a bottle resting in the chute, breaking it and allowing the fractured glass pieces to fall into the glass receptacle.

U.S. Pat. No. 2,558,255 issued June 26, 1951 to N. E. Johnson et al. diseloses a remote controlled glass breaking machine in which bottles in particular are slid down a tube to intercept a horizontally rotating motor driven fracturing blade.

U.S. Pat. No. 3,353,756 issued Nov. 21, 1967 to D. J. Morgenson describes a further type of horizontally rotating hammer blade through which glasswear such as bottles are dropped. The blades rotate at a high speed such as 1700 r p.m.'s so that a bottle dropped through the blades may be struck as many as sixty times for each second the bottle remains in the contact zone.

U.S. Pat. No. 3,655,138 issued Apr. 11, 1972 to G. A. Luscombe strikes bottles or other glasswear inserted down a chute with a plurality of rotating hammer blades Deflecting blades are arranged under the hammer blades to enhance distribution of the glass material under the hammer blades U.S. Pat. No. 3,889,886 issued June 17, 1975 to J. D. Spivey discloses a waste bottle fracturing device in which bottles fall through or past safety baffles which slow down the entrance of the bottles into rotating multiple arm blades and prevent broken glass from being ejected upwardly out of the crusher.

While it has been known, therefore, generally to crush glasswear by mechanical crushing means in order to decrease its bulk prior to disposal, the crushing of glass bottles and the like and the crushing of glass receptacles containing hazardous materials such as fluorescent tubes and the like is something quite different. Hazardous materials such as the toxic phosphors coating the inside of fluorescent tubes or the mercury vapor trapped in the tube adds an entirely new dimension to the problem. A number of devices, machines and/or systems have been suggested or developed for the crushing of fluorescent tubes in order to decrease their bulk. Some of such devices are the following:

U.S. Pat. No. 2,593,657 issued Apr. 22, 1952 to A. J. Coon et al. discloses a reciprocating-type crusher designed to crush fluorescent tubes and the like. Coon et al. discloses that during crushing of the tubes the beryllium compound that adheres to the inner walls of the tube as a layer of dust has a tendency to become suspended in the surrounding air. Coon et al. attempts to alleviate this problem by providing an exhaust for air withdrawn from the treatment or fracturing zone and releasing such air "to the outer atmosphere whereupon it is safely dispersed into space". Coon et al. also discloses that he uses an airtight casing so there is as little escape of air and dust as possible until the air stream is discharged to the outer atmosphere While Coon et al. uses an air stream to remove toxic materials from the tube fracturing zone of the machine, there is no evidence that Coon et al. recognized that a fairly tight fit should be maintained about the fracturing zone in order to make a reasonably clean separation between the toxic materials and the glass particles.

U.S. Pat. No. 2,620,988 issued Dec. 9, 1952 to E. H. Tellier discloses a fluorescent tube chopping device arranged for continuous flushing of the fracturing zone with a stream of water to flush the toxic materials from such fracturing zone. There is no separation between the potentially toxic dust and the crushed pieces of glass, both being collected in a lower removable receptacle. Because the potentially toxic materials are not removed from the glass particulates, the materials cannot be used again, since the toxic materials prevent re-use of the glass and the glass, in effect, contaminates the remainder of the materials originally contained within the outer tube or sheath preventing their recovery.

U.S. Pat. No. 2,628,036 issued Feb. 10, 1953 to J. B. Hall discloses a fluorescent lamp disposal arrangement in which fluorescent tubes are passed lengthwise down a tubular inlet at the bottom of which the fluorescent tubes are progressively fractured into pieces by a rotating hammer arrangement. A large suction fan is arranged at the top or upper end of the system and a water inlet is arranged just above the chopper blades. During operation of the device, therefore, there is a countercurrent flow of material through the apparatus with fractured tube material traveling downwardly together with flushing water or other material and the air stream passing upwardly to draw out gases The fractured glass and metal may be separated from the water containing the toxic beryllium powder by means of a screening arrangement and the metal tips separated from the glass by magnetic means.

U.S. Pat. No. 2,866,604 issued Dec. 30, 1958 to J. B. Hall discloses a fluorescent tube disposal device including a rotary breaker arm disposal arrangement bathed in water during actual breaking of the fluorescent tubes. Hall uses a magazine to contain the fluorescent tubes and provides for a draft of air to be drawn through the magazine during use.

U.S. Pat. No. 3,913,849 issued Oct. 21, 1975 to I. M. Atanasoff et al. discloses a fluorescent tube digester or breaker. The Atanasoff et al. device is made to fit on the top of a barrel and to draw air downwardly through the chamber and out the usual bung hole where there is provided a surface filter arrangement to remove phosphorus and mercury from the air stream.

While the prior devices noted above have enjoyed at least a modicum of success, serious problems and inconveniences have persisted. In particular, the separation between the toxic materials and the supporting and confining materials has not been sufficient to allow such supporting and confining materials, i.e. essentially the glass, to be disposed of or reused without special precautions because of hazardous inclusions and the toxic material i.e. the mercury, beryllium, cadmium, and other fluorescent materials, have not been separated sufficiently from the supporting and confining materials, i.e. the glass, to allow handling in a relatively constricted volume and/or effective complete recovery The most successful systems, furthermore, have incorporated a washing step. Washing, however, creates a large volume of polluted water which must then be dealt with in turn and in addition, creates wet, heavy and often sticky materials that are inherently difficult to handle and/or dispose of. There has been, consequently, a definite need for a method and means that is economical, convenient and effective in treating or digesting used fluorescent tubes and that makes an effective separation of the toxic materials from the supporting and confining materials by a dry separation means.

OBJECTS OF THE INVENTION

It is an object of the present invention, therefore, to provide an apparatus for treating used fluorescent tubes that effectively separates the toxic materials from the supporting and confining materials by a dry method.

It is a further object of the invention to provide a method and means for treating used fluorescent tubes to reduce the tube material to a minimum volume while effectively separating toxic materials from the glass tube material.

It is a still further object of the invention to provide a method and means for separating the toxic materials from the structural material of a fluorescent tube by an air separation method.

It is a still further object of the invention to provide a method and means for separating toxic materials from the structural material of a fluorescent tube by means of a combined concurrent and countercurrent blast or flow of gas or air.

It is a still further object of the invention to make a clean separation by a dry method of the toxic materials in used fluorescent tubes more efficient by a factor of at least ten than has heretofore been possible.

Other objects and advantages of the invention will become evident from reference to the accompanying drawings and description.

BRIEF DESCRIPTION OF THE INVENTION

It has been found by the present inventor that a very good separation can be made between the toxic powder coating the inside of fluorescent tubes and the glass material which is coated, if during the active fracturing of the glass into restricted sized pieces, a large draft or flow of air is passed through the comminuting chamber. The jarring and shaking of the glass incident to rapid and progressive shock fracturing of the glass tube by rapidly rotating chopper blades effectively shakes off a major portion of the toxic dust from the inside surface of the tube and this toxic dust is then entrained in a very rapid flow of gas across the surface of the fractured pieces of the glass. The rapid flow of air or entraining gas is promoted by providing a restricted size fracturing chamber. Countercurrent flow of the entrainment gas with respect to the fractured glass particulates is preferably provided during at least the terminal portion of the passage of the glass through the fracturing apparatus.

More particularly, it has been found that the separation of the fractured glass particles derived from the confining envelope of glass which contains and separates the vapor and phosphors of a fluorescent tube from the environment during use can be facilitated and made practical by an initial arrangement in which the glass envelope is fractured by a rotating blade closely confined in a fracturing chamber which surrounds the rotating blade. Atmospheric or other gas is preferably drawn through the fracturing chamber from the upper portions thereof to a position just below the rotating blades where the air stream is exhausted to a forced draft separation system including preferably either a cyclone or a baghouse followed by a fine filter such as a HEPA filter followed by a large activated carbon or charcoal filter or absorber through which air is passed by forced draft fans or the like.

Preferably the initial fracture zone is divided into a primary fracture zone at the top in which a rotating fracture blade is closely confined and through which air or other stripping gas is drawn generally downwardly and out through a vacuum pipe connected preferably just below the upper or initial fracture zone and a secondary countercurrent air passage zone through which the fractured glass particles fall or descend countercurrent with an upward flow of air or other stripping gas which also exits from the fracture chamber just below the rotating fracture or chopper blades. The glass particulates in this manner are first, during actual fracturing, exposed to a rapid flow of gas generally in the same direction as the passage of the fractured glass, although this fractured glass is actually, due to the impact with the chopper blades, forcefully directed against the walls of the fracture chamber in an unpredictable but highly energetic manner forcefully shaking and abrading the glass particulates and removing the adhering phosphors and low melting metal vapors from the glass particulates. The fractured glass particulates then fall from the bottom of the primary fracture chamber through a secondary countercurrent air or gas chamber or zone in which air or gas flow is maintained countercurrent with the free fall of the glass particulates to strip phosphor particulates from the glass. The countercurrent stripping air enters the countercurrent portion of the chamber from a main collection chamber outside or surrounding the countercurrent air passage chamber or zone. At the bottom of the countercurrent air passage chamber, the fractured particulates pass through an orifice or opening into the main collection chamber of the apparatus which may take the form of a collection barrel or container or the like and may include a plastic bag or the like which collects the fractured glass particulates. The orifice or opening through which the fractured glass passes into the collection chamber is sufficiently constricted to generate a rapid passage of gas to actively oppose passage of the glass particulates and to thoroughly strip them of any clinging particulates.

In an improved version of the apparatus, which is the subject of a concurrently filed application for patent, the countercurrent air passage chamber is provided with a series of jarring surfaces upon which the glass particulates progressively impact, each time shaking additional dust and the like from the surface. At least two and preferably more impact surfaces or jarring surfaces are provided to improve the removal of toxic dust and small particulates from the surface of the fractured glass particulates.

While the toxic powders could be transported in the air stream to a fine filter and removed directly from the air stream, this has been found to be impractical due to the volume of particulates and they are therefore deposited first preferably either in a cyclone-type collector or some other progressively self-cleaning filter arrangement. As shown in the accompanying drawings, this preferably takes the form of a cyclone, followed by a fine filter and lastly by a carbon filter of relatively large or massive size to afford a large relative air passage to absorb and remove in particular, mercury from the air stream.

BRIEF DESCRIPTION OF THE DRAWINGS

FIG. 1 is an overall partially broken away side view of the apparatus of the invention.

FIG. 2 is an enlarged broken away side view of the fracture and countercurrent flow chambers of the invention.

FIG. 3a is a broken away enlarged front view of the fractured and countercurrent flow chambers of the invention.

FIG. 3b is a broken away enlarged rear view of the fracture and countercurrent flow chambers of the invention.

FIG. 4 is a broken away enlarged side view of a alternative embodiment of the countercurrent flow chamber of the invention showing impact surfaces or baffles provided in the countercurrent flow chamber.

FIG. 5 is a view of one embodiment of the rotating fracture blade of the invention.

FIG. 6 is a broken away side view of an alternative arrangement of a concurrent gas flow fracturing chamber and a countercurrent gas flow chamber equiped with multiple jarring surfaces.

DESCRIPTION OF THE PREFERRED EMBODIMENTS

As indicated above, the present inventors have provided a very efficient fluorescent tube chopping and recovery apparatus which effects a very complete dry separation between fractured glass particulates and the potentially toxic particles or dust coating the inside of the original glass envelope of a fluorescent tube plus the metallic vapor within the tube. The inventors have discovered that such very complete separation can be obtained if an accelerated air flow through the fracturing zone and an adjacent zone is established with the air then being transported to a collection system including initially a collector such as a cyclone collector where the largest particle sizes are removed from the air stream followed by at least one filter to collect finer particulates and a final activated carbon or charcoal filter having a very large area where metallic vapors are separated or absorbed from the air stream. It has been found particularly important that a rapid flow of atmospheric gas or air be passed through the fracturing zone where the fluorescent tube is progressively fractured by rotating blades into individual small pieces. It has been found that the fracturing blade should be only slightly narrower than the fluorescent tube itself and that the clearance between the ends of the blades and the sides of the chamber should be quite restricted in order to provide an accelerated flow of air through the chamber and past the glass particulates as they are fractured. The fracture chamber casing should preferably also be constructed so that the fractured glass particulates tend to be bounced or deflected at least several times between the walls of the chamber and the chopping or fracturing blades before they leave such chamber. In this manner, the glass particulates are jarred sufficiently to shake loose adhering toxic dust particulates and the rapid flow of air carries the toxic dust particulates away from the glass particulates before any transient electrostatic forces or fields cause clumping of the dust particulates again upon the glass particulates.

The glass particulates formed in the fracture chamber then fall through a very rapid countercurrent flow of air or stripping gas which further separates or strips any residual dust particualtes from the surface of the glass particulates. This countercurrent flow of air meets the rapid flow of air or stripping gas which has passed through the fracturing chamber and carries such air out an exhaust orifice preferably positioned between the two separate sections of the treatment chamber, i.e. preferably after the fracture chamber and near the beginning of the countercurrent flow chamber. In this manner, the falling fractured glass particulates are not only stripped of any residual dust particles by rapid passage through progressively cleaner stripping gas, but the initial gas which is passed through the fracturing chamber in the same general direction as the passage of the glass particulates during fracturing is fairly abruptly removed from the vicinity of the glass particulates as the dust laden air is turned aside from the passage of the glass particulates and carried from the chamber while the glass particulates themselves fall into a relatively clean countercurrent flow of air which becomes progressively cleaner as the glass particles descend or fall through such flow of air. It is believed that the fairly abrupt removal of the toxic dust particulates from the glass and entrained dust stream has beneficial effects in preventing the dust particulates, once jarred from the surface of the glass particulates, from becoming reunited with the glass particulates through electrostatic or other effects.

It has been found by experimentation that it is important that the stream of countercurrent air or other stripping gas flowing up through the countercurrent stripping chamber be significantly more accelerated than the stripping gas such as air passing through the fracture chamber or zone. The differential in speed may desirably be, in fact, in the neighborhood of about 100 to 1, i.e. the flow of air or other stripping gas through the countercurrent stripping zone should have a velocity approximately one hundred times the velocity of passage of air through the fracture zone. This large differential is believed to be due to the fact that the passage of gas through the fracture zone should be sufficient to prevent back flow of gas out of the feed tube or opening into the fracture chamber and under sufficient vacuum or reduced pressure in order that the fracture chamber is continuously under vacuum so an leaks in the chamber will experience a net inward flow of air to prevent the escape of any toxic powders or fumes from the chamber. The gas passage through the fracture chamber should also be sufficiently rapid to keep the chamber clear of any significant build-up of powder or dust in the portions not swept by the rotating fracture blades. The air or other gas flow through the chamber should also be sufficiently rapid so that the powder released from the fractured glass particulates is immediately entrained in the gas and tends to be carried separately from the glass particulates through and from the chamber. It has been found that a gas flow velocity of approximately at least 50 to 75 cubic feet per minute through each square inch of open cross sectional area of the fracture chamber is adequate for such flow of gas to keep the fracture chamber clear and generally entrain the powder separated from the surface of the glass. Since the flow of gas tends to be impeded when fluorescent tubes are inserted into the feed chute or orifice and to resume more freely when the tube is drawn into the fracture chamber, the gas flow through such chamber tends to assume during operation, a pulsing or pulsating nature or characteristic which aids in removing deposits of dust from the chamber in the air or gas stream. In addition, since some of the fluorescent tubes implode when first struck by the fracturing blade in the fracture chamber, these implosions cause a further disturbance in the gas flow. It is important that there be sufficient flow of gas engendered by a sufficient negative pressure or vacuum on the opposite side of the chamber so that no blow back from the chamber to the environment occurs even when a fluorescent tube implodes. As indicated, a gas flow of from 50 to 75 feet/minute is the lower limit of suitable flow in this respect, but it is preferred to have a gas flow through the fracture chamber of at least 100 to 200 feet/minute or even greater to make certain no toxic powder escapes eve during implosions of the tubes.

The countercurrent air or other stripping gas passing upwardly through the countercurrent stripping chamber, on the other hand, should be very rapid so as to physically strip any loose phosphor powder from the surface of the glass particulates and remove it from the vicinity of the glass particulates. Basically, the acceleration or, more correctly, the velocity of the gas through the countercurrent stripping chamber should be at least in the neighborhood of 7200 feet/minute and may range up to 9000 feet/minute. A less desirable lower limit may be as little as 6000 feet/minute. The relative velocity with respect to the movement of the glass particulates is somewhat higher, since the particulates are actually falling through the gas, providing a relatively higher differential speed between the glass and the stripping gas. Stated in functional terms, the velocity of the stripping gas should be sufficient to strip substantially all loose powder from the surface of the descending glass particulates and to carry all loose powder upwardly away from the glass particulates into the gas offtake from the chambers allowing no loose powder to exit from the bottom of the stripping chamber, but not sufficient to carry the glass particulates upwardly. Preferably, the glass particulates should not be significantly retarded in their passage under the influence of gravity downwardly through the stripping chamber. This, of course, depends somewhat upon the size of the glass particulates If the glass particulates become very small or powder-sized, they will be carried upwardly, particularly if the countercurrent stripping gas flow is very fast.

When the upwardly flowing stripping gas reaches the outlet, it should also substantially entrain all the gas and entrained powder in the stream of gas passing downwardly or substantially downwardly through the fracturing chamber. As indicated, a velocity of stripping gas through the countercurrent stripping chamber of 7200 feet per minute has been found to be very satisfactory, but the exact velocity may vary. The upper limit will somewhat depend upon the fracture size of the glass particulate as larger pieces of glass will fall through a higher velocity gas stream without being significantly retarded or carried away. The lower limit cannot be less than will effectively carry upwardly the phosphor powders removed or separated from the glass particulates.

The air stream exhausted from the fracturing zone and the countercurrent air flow zone are then passed initially into a rough particulate separator that can be continuously cleaned or emptied, or at least has a large capacity between cleanings such as a centrifugal or cyclone separator where the principal portion of the removed particulates are separated from the gas stream. The gas stream is then pased through a fine filter fabric or other fine filter which removes the residual dust particulates. The entire air stream is then passed through an activated carbon or charcoal-type filter where metallic vapor such as mercury vapor is removed from the gas. The air exiting from the activated carbon filter is completely particulate-free and has also been cleansed of metallic vapors.

FIG. 1 shows diagrammatically a side elevation of a partially broken away depiction of the fluorescent tube treatment apparatus of the invention in which the entire apparatus 11 is coordinated to provide a very superior dry separation of the toxic interior contents of fluorescent tubes from the glass envelope materials of such tubes when the glass envelope is fractured into pieces to reduce the volume for disposal. An initial fracturing and separating device or means 13 is provided with a rotating blade 15 powered by a motor, not shown. The rotating blade is positioned to rapidly strike the end of a fluorescent tube 17 that is extended or passed progressively down a feed chute 19. The feed chute 19 is shown shorter than the fluorescent tube to better illustrate the fluorescent tube 17. However, it is desirable for the feed chute 19 to be longer than the fluorescent tube so that, if the tube implodes when struck by the fracture blade 15, the flying glass will be contained and toxic materials within the tube will be sucked into the apparatus rather than escape to the environment. The feed chute 19 should have a fairly close fit with the outside of a fluorescent tube, at least in one portion, so a rapid flow of air or other gas is established when gas is drawn between the two, but not so great that excessive pressure pulsation will be engendered as the fluorescent tubes pass down the feed tube.

The rotating blade 15 is preferably rotated, as shown in FIG. 1, counterclockwise so that the tube or glass envelope 17 is struck downwardly, progressively breaking off small chunks of the tube which at the same time shatter into individual pieces of glass. These individual pieces of glass are thrown against the side of the chamber. The shock of both the initial fracturing and the later impact with the walls 21 of the fracture chamber 23, i.e. the upper portion containing the fracture blade 15 of the fracturing and separation device 13, causes the dust particulates coating the inside of the glass envelope to be jarred loose from the surface. These small dust particulates, which are normally adhered to the inside of the fluorescent tube by a suitable thin film of adhesive or other suitable expedients, after jarring loose become entrained in the air stream within the chamber, which air stream or flow passes initially down the feed chute alongside the fluorescent tubes into such chamber and progresses through the fracture chamber 23 to the exhaust conduit or tube 25 which opens into the fracturing and separating device 13 just below the fracture chamber 23. A vacuum or suction is applied to the exhaust tube 25 from a suction or draft device farther down the line, in this case through a suction fan 27 which discharges air drawn through such fan with a forced draft directly into a massive activated carbon or charcoal-type filter 29.

Below the fracturing chamber 23 of the fracturing and separating device 13 is positioned a countercurrent flow chamber 31 through which air is sucked upwardly from the terminal opening 33 from a particulate collection chamber 35 which may comprise a steel barrel-type collector or any other type collector. A top or lid 37 closes off the upper portion of the barrel collector and in the embodiment shown also supports the fracturing and separating device or means through the side walls 39 of the countercurrent flow chamber 31. The side walls of the countercurrent flow chamber 31 are shown with substantially straight verticle sidewalls 39, but could have gradually converging side walls toward the bottom or, less preferably, toward the top of the flow chamber. The countercurrent flow chamber may be either cylindrical or rectangular, but will often be conveniently rectangular, particularly where there are baffles in the chamber as disclosed in FIGS. 4 and 6 hereinafter described.

The fractured or broken glass particulates, after being fractured in the fracture chamber 23, fall through the countercurrent flow chamber 31 and through the terminal orifice 33 into the collection chamber 35. During their passage, essentially in a free fall state downwardly through the countercurrent flow chamber 31, they are acted upon by upwardly flowing gases or air passing through the terminal orifice 33 from the collection chamber 35 into and through the countercurrent flow chamber and into the vacuum or suction conduit 25.

In the embodiment shown in FIG. 1, the gas, or in this case, the air from the collection chamber 35 is derived from an inlet 36, but such air could be derived from different sources such as, for example, leaks in the chamber 35, particularly around the lid 37, and the like. As these upwardly flowing gases pass the falling glass particulates passing downwardly through the countercurrent flow chamber, they strip any partially detached or loose residual toxic dust o powder particles from the surface of the glass particulates and carry them upwardly to the inlet of the suction tube 25 through which the gas and entrained particles are exhausted to subsequent filter apparatus to be described.

As indicated previously, the velocity of the upwardly flowing gas through the countercurrent flow chamber 31 may desirably be about 7200 feet per minute, plus or minus perhaps ten percent. Less desirably, the gas velocity may be about 6000 to 9000 feet per minute. In all cases, the velocity of the gas passing upwardly through the countercurrent flow chamber 31 should be sufficient to strip away any loose powder adhering to the glass particulates and carry it upwardly to and out the exhaust conduit 25, but insufficient to carry upwardly any significant quantity of glass particulates. In other words, the upwardly flowing gas stream can be characterized as having a differential separation velocity as between powder originally coating the inner surface of the fluorescent tube and fractured glass particulates.

It will be seen in FIG. 1 that the descending gas or air passing through the fracturing chamber 23, the passage of which gas is substantially aided by the counterclockwise rotation of the rotatable blade 15, meets the upwardly passing gas or air flowing through the countercurrent flow chamber at the outlet to the suction counduit 25 and both air or gas streams there merge and pass into the conduit 25. In this manner, the falling glass particulates rather suddenly meet the upwelling body of relatively clean gas in the countercurrent flow chamber 31 and the surrounding dust particulates are very effectively and quickly stripped away from the glass particulates which pass quickly through the interface between the two air streams and continue downwardly through the upwardly passing clean stripping gas.

The area at the bottom of the fracture chamber 23 where the two streams of air or other gas meet, is an area of tumultuous turbulence, due not only to the meeting of the two streams of gas, but also due to the rotation of the fracturing blades and the rapid passage of heavier glass particulates through such area of turbulence. The turbulence of the area particularly just before the glass particulates descend quickly through the interface between the two air streams is believed to aid separation of the powder from the fractured glass particulates. Fairly sudden removal of the major portion of the dust or powder particulates from the vicinity of the glass particulates as the glass particulates pass through the interface between the two air streams and meet the upwelling flow of countercurrent stripping gas is also believed to be beneficial in avoiding reuniting of the powder particulates and glass by electrostatic effects and the like. Since there should be considerably more stripping gas passing upwardly through the stripping chamber 31 than gas passing downwardly through the fracture chamber 23, the large amount of stripping gas rather easily merges with, and in effect, entrains the gas passing from the fracture chamber and carries it into the outlet or suction conduit 25.

The two streams of gas or air, the one from the top fairly well saturated with small particulates separated from the fractured glass particulates in the fracture chamber 23, and the one from the bottom being much cleaner countercurrent stripping gas, after being drawn into the exhaust conduit 25, pass through said conduit first to a cyclone-type separator 41 where a swirling motion is set up by the angle of the gas entering from the side. Such swirling motion combined with the increase in the volume of the passage, as generally known to those skilled in the art, causes the upper range of the small particulates entrained in the gas to move outwardly in the gas stream and to separate from the gas stream against the side of the cyclone apparatus and fall along the sidewall to the bottom of the cyclone separator where the particulates can be periodically allowed to pass by gravity from the bottom of the cyclone through a suitable discharge opening, not shown, into any suitable receptacle, also not shown.

The gas from which the particulates have separated largely by having been thrown against the sides of the cyclone chamber 43 by the spiraling action of the gas, meanwhile fills the center of the chamber and wells or passes upwardly from the chamber through a central dependent conduit 45, the shape of the outer surfaces of which serves initially also to aid in initiating the swirling motion of the gas passing into the cyclone device. The upwelling gas passes through the conduit 45 into an upper chamber 47 from which it is exhausted through a further conduit 49 into the top of a filter chamber 51. Within the top of the filter chamber 51 there is preferably a high density fiber filter 53 which preferably takes the form of a paper-type filter bag into which the air passes and which holds back any particulates as the air escapes from the filter cloth. This bag receives only a small amount of particulates, since the bulk of particulates have already been largely removed from the gas stream by the cyclone separator 41. The filter bag consequently needs to be changed only infrequently to remove the particulate deposits.

Below the bag filter 53 there is preferably a so-called high efficiency particle air or HEPA-type filter 55 for removing very fine particulates from the air stream. Preferably this HEPA filter is also shielded on the outside by a very fine or dense cloth filter 57 which covers the entire outside of the HEPA filter to preserve its open pores for as long as possible. A filter made from Dacron polyamide material has been found very suitable. The HEPA filter 55 is provided with an outlet 59 which leads from the filter chamber 51 to the suction fan 27 previously identified. This fan 27 is operated or rotated by a motor 61 and exhausts from an outlet 63 which opens into the approximate center of the activated carbon or charcoal filter 29 previously identified.

The activated carbon or charcoal filter 29 is formed of a central chamber 30 within the center of a series of flat activated carbon panels 32 usually about one-and-a-half to two inches thick. The panels are fitted together so that an essentially gas tight chamber is formed having a fairly large central opening and outer walls formed of carbon panels through which gas entering the central chamber and spreading out through the chamber slowly passes while metallic vapors such as mercury vapor in the gas are absorbed into the activated carbon. The large volume of the central chamber 30 and the large area of the activated carbon panels 32 surrounding the central chamber ensure that the gas velocity is slowed down sufficiently to allow sufficient retention time in the activated carbon panels to absorb the metallic vapors in or upon the activated carbon or charcoal. After the carbon panels are partially saturated with metallic vapor, the panels 32 are changed to renew the absorption capacity of the carbon filter panels.

As known to those skilled in the art, charcoal or activated carbon is a very efficient absorbent for metallic vapors such as mercury vapor and may also serve as an effective filter for very small particulates which become entrapped both on the surface and in the pores of the charcoal. Consequently, as the fan 27 exhausts the air or gas stream through the outlet 63, the mercury vapor from the interior of the fluorescent tubes is essentially carried through the entire system and finally exhausted from the outlet 63 into the center of the activated carbon or charcoal filter from which the air perculates through the activated carbon or charcoal to the exterior while the mercury vapor is absorbed by the carbon or charcoal. As noted above, a very large area of charcoal or carbon filters is used. This allows very extensive perculation of the air or other gas through the charcoal or activated carbon filter and effective complete absorption of the mercury vapor in the discharge from the outlet 63 by the charcoal or activated carbon. The velocity of the gas through the filter should not be greater than 65 feet/minute in order to allow absorption of all the mercury vapor from the gas stream.

It will be noted in addition that the air is forced into the activated carbon or charcoal by pressure rather than drawn through the charcoal by a negative or decreased pressure established on one side of the filter. Since the charcoal is rather dense and no substantial passages should be allowed in it, if complete mercury absorption is to be accomplished, it is more efficient for the air to be applied to the charcoal under a positive pressure rather than drawn through by atmospheric pressure working against a negative pressure The large size of the filter, furthermore, makes it more convenient to apply a pressure gradient by forced air flow rather than by a suction or reduced pressure gradient.

As indicated at the beginning of this description, it is critical that a fairly large, but not inordinate volume of gas pass through the glass fracturing chamber 23 at a relatively high speed in order to strip the glass particles while they are being fractured of toxic dust particles originally adhered to the inner surface of the fluorescent tube and entrain such dust or powder particles. It is also important that countercurrent stripping gas be passed upwardly or countercurrently to the downward passage of fractured glass particulates as they pass from the fracturing zone. It has been found, as indicated above, that for best operation the gas should pass through the fracturing chamber at a rate of at least 50 to 75 feet per minute for each square inch of gas passage cross-sectional area in the main fracturing zone of the fracture chamber with higher flows of gas such as 100 to 200 feet per minute or greater being desirable. Likewise, it has been found that the upward gas passage countercurrently with the descending glass particulates should preferably be at a rate of at least 7200 feet per minute for each square inch of gas passage cross sectional area in the most constricted portion of the countercurrent flow chamber. This rate of gas flow can only be attained if the passages themselves are fairly constricted and the large volume of gas can be pulled through the suction tubes 25 and 49 by the suction created by the forced air fan 27. Consequently, in order to attain a consistently high flow of gas, it is important that the filter mechanism used not become easily clogged. This is accomplished by the arrangement shown in FIG. 1 and particularly by the use of the initial cyclone-type separator in the filter train.

FIG. 2 is an enlarged broken away view of the fracturing chamber 23 shown in FIG. 1 as well as the countercurrent flow chamber 31 broadside of the fracturing blades showing the constricted operating clearance between the side of the blade 15 and the end walls 21 of the chamber. It will be understood, furthermore, that the fracture blade should preferably be only slightly wider than one of the fluorescent tubes to be fractured. Such combination ensures that the area available for the passage of the gas flow through the chamber is as restricted as possible, further assuring that the gas passes at high speed through the passage. This is further illustrated in FIGS. 3a and 3b described below. The fracturing blade 15 is shown horizontally disposed in full lines and vertically disposed in broken lines in FIG. 2 to illustrate the fairly close spacing between the end walls 21 and the ends of the fracture blades 15.

FIGS. 3a and 3b are enlarged broken away views of the fracture chamber viewed transverse to the axis of the shaft of the fracturing blade from the front and the rear respectively. It will be recognized from this view also that the clearances between the closest sides, i.e. the side walls 22, of the chamber and the rotatable blades 15 is quite constricted, making the attainment of a significant flow of gas through the fracturing chamber 23 practical. In fact, the fracture blades have, for clarity, been shown in the various figures with more clearance between the blade and the chamber walls and, in effect, smaller blades, than would preferably actually be the case.

FIG. 4 is a side view, again broken away, showing an improved embodiment of the invention which is the subject of a concurrently filed application for patent. In this arrangement, a pair of jarring steps or baffles 65a and 65b are shown extended from the side wall of the countercurrent flow chamber 31. These steps 65 are provided with generally upwardly directed slanted impact surfaces or planes 67a and 67b onto which the glass particulates drop or are initially projected by the rotating blades 15 and then bounce from one to the other of such surfaces. Each impact with the impact surfaces 67 has been found to dislodge additional powder and any other contaminants from the surfaces of the fractured glass particulates increasing the separation between the glass and the toxic powder particles. Between impact surfaces, the glass particulates pass downwardly through the countercurrent flow of stripping gas which removes dislodged toxic particles and other particulates from the immediate vicinity of the glass particulates and carries them upwardly into the suction tube 25. While only two jarring surfaces 65a and 65b are illustrated in FIG. 4, the first extending outwardly into the countercurrent flow chamber 31 from the end wall 21, and second constituting a matching slanted portion of the actual side wall 21 of the countercurrent chamber 31, additional jarring surfaces of various types can be provided in the countercurrent flow chamber. FIG. 4 also illustrates an arrangement of the invention in which the fracturing and separating device 13 together with a motor 69 to drive the blade 15 through a belt drive 71 are mounted on a unitary head or base 73 that fits on top of the collection chamber 35, only the upper portion of which is shown. A cover 75 may be mounted over the entire assembly. The jarring step or baffle 65a in FIG. 4 essentially defines the separation between the fracturing chamber 23 and the countercurrent flow chamber 31.

It will be understood that while the improvement shown in FIG. 4 is very significant and it is preferred to operate with it, such improvement is not necessary to attain some of the principle advantages of the invention and does not, therefore, constitute a part of the present invention.

FIG. 5 shows an enlarged view of the glass envelope fracturing blade used in the apparatus of the previous figures. It will be noted in FIG. 5 and also in FIGS. 3a and 3b that the center section 77 of the rotating blade is essentially flat while the ends are twisted to provide both more or less flat paddle-like blades 79 to sharply strike the end of the fluorescent tubes to fracture said tubes. The end blades 79 are somewhat inclined, with respect to their direction of rotation, to create a current of air and a certain amount of atmospheric turbulence in the fracturing chamber as the blade rotates. It will be noted that while the paddle portions of the blades extend substantially across the fracturing chamber to minimize the cross-sectional open area and increase the velocity of the gas passing over the blades and past glass fractured by the blades, the central portion of the blade being flat allows a fair amount of air to pass around the center of the blade. This also insures a rapid atmospheric flow through the fracture chamber 23 and prevents airlock from developing within the fracture chamber which would prevent good suction from developing in the fracture chamber decreasing the air flow in the feed tube 19 in FIG. 1 and possibly allowing toxic materials to escape from the feed tube. The open space at the center of the blade also insures that the upward airflow through the countercurrent flow chamber 31 and the downward flow through the fracturing chamber are maintained at a fairly even rate so a balanced flow is delivered to or passed into the suction conduit 25. Otherwise, one or the other flows might be interfered with by pulsations caused by the rotation of the paddles at the ends of the fracture blades leading to escape of air carrying potentially toxic material from the apparatus.

FIG. 6 shows an alternative embodiment of the invention in which the side walls 21 of the fracture chamber 23 are curved to maintain the ends of the fracture blades always a set distance from the sidewall. This prevents any possibility of the steel tips on the end of fluorescent tubes from becoming jammed between the blade and the sidewall, although this is not likely to happen in the other embodiments either since the steel tip tends to travel downwardly and out the bottom of the fracture chamber after being struck by the fracture blade. The curved configuration also somewhat increases evenness of the air flow through the apparatus. As explained above in connection with the previous embodiments, it is desirable for the central portion of the fracture blade to be configured so it does not interfere with the flow of gas through the chamber.

A further change or improvement in the embodiment of FIG. 6 is that there are more than two jarring surfaces 65 within the countercurrent flow portion of the apparatus. There is, in fact, an effective labyrinth of jarring steps 65c, 65d, 65e and 65f with opposed surfaces 67c, 67d, 67e and 67f with opposed surfaces 66d, 66e and 66f between which a tortuous passage 68 winds and through which a stripping gas and glass particulates move countercurrently. The stripping gas, usually air, moves up the passage at a high rate, as explained above, and glass particulates fall down through the passage 68 bouncing from one impact surfaces 67c, 67d, 67e etc. to the next. As will be seen from the drawing in FIG. 6, it is physically impossible for the glass particulates to progress in a straight line through the passage 68 so that the glass particulates must, in effect, drop from one surface to the next, each time jarring and shaking the particulates and causing dislodgment of toxic powder from the surface of such glass particulates. This toxic powder is then caught up in the countercurrent air or gas flow and carried upwardly through the tortuous passage 68 and into the take-off which is positioned just below and partially in back of the upper jarring step 65c. The distance of the jarring surfaces 67c, 67d, 67e and 67f from each other should be sufficient to allow sufficient acceleration of the glass particulates as they fall from jarring surface to jarring surface with sufficient impact to dislodge powder from the surface, but insufficient to cause additional fracturing of the glass. It is undesirable for the glass particulates to be broken into too small particles else they may also be entrained in the countercurrent gas stream and removed with the toxic powder rather than with the glass.

As will be recognized, the present invention carefully balances a number of factors in order to attain an economical and efficient fluorescent tube digestion or crushing and separation system. In accordance with the invention, a flow of air is established through the fracturing and countercurrent flow sections of the apparatus which is sufficient to effectively strip the phosphor from the broken or fractured glass. This requires a careful balancing whereby the air flow through the noted chamber is sufficient to strip the phosphor material from the glass surfaces and prevent escape of phosphor or mercury laden air, combined with a filtering system that is efficient and stable over long periods between cleaning of the filters while removing substantially all powders and other materials from the air stream.

It should be understood that although the present invention has been described at some length and in considerable detail with some particularity with regard to several embodiments in connection with the accompanying figures and description, all such description and showing is to be considered as illustrative only and the invention is not intended to be narrowly interpreted in connection therewith or limited to any such particulars or embodiments, but should be interpreted broadly within the scope of the delineation of the invention set forth in the accompanying claims thereby to effectively encompass the intended scope of the invention.

We claim:

1. A digester system for scrap fluorescent tubes for decreasing bulk of glass components of such tubes and allowing use of the component glass for recycling while collecting toxic dust and fumes for separate safe disposal comprising:
   (a) a first casing portion arranged and constructed for substantially closely surrounding and enclosing a rotatable chopping blade for fracturing used fluorescent tubes into reduced-size individual glass particulates,
   (b) an enclosed feed chute extending toward the chopping blade casing, said chute having an internal diameter such as to allow free passage of used fluorescent tubes therethrough, but with a restricted clearance at least in one portion of the chute to limit air passage through the chute when a fluorescent tube is passing therethrough,
   (c) a rotatable tube chopping blade having a width not substantially greater than the diameter of the feed chute positioned to intersect fluorescent tubes passing through said feed chute into said first casing portion,
   (d) a second casing portion interconnected with and extending downwardly from the first casing portion toward a particulate outlet at the lower end of the second casing portion and having restricted internal dimensions including a longitudinal dimension at least several times its internal transverse dimensions such that a substantial flow of air at least through a substantial portion of the second casing along its longitudinal dimension between the particulate outlet and the first casing portion can be maintained during chopping of fluorescent tubes,
   (e) the first casing portion and second casing portion defining an internal interconnected air passage substantially vertically oriented and extending from a location adjacent to the rotatable chopping blade downwardly to the particulate outlet,
   (f) an offtake from the second casing connected to a vacuum suction system means for drawing air from the casing and into a centrifugal separator means followed by a filter and mercury absorption means,
   (g) said offtake being positioned and the vacuum system being arranged and constructed to provide a rapid flow of air past the fractured glass particulates at least in the substantial portion of the second casing after fracturing by the tube chopping blade.

2. A digester system in accordance with claim 1 wherein the offtake is positioned such that air is drawn substantially through at last the substantial portion of the second casing portion countercurrently with the descent of glass particulates through such portion of the second casing.

3. A digester system in accordance with claim 2 wherein the off-take is positioned so that stripping air passes through the upper portion of the casing containing the fracture blade concurrently with movement of fractured glass particles through said upper portion of the casing and countercurrently through the lower portion of the casing with the descent of fractured glass particulates through the casing.

4. A digester system in accordance with claim 2 wherein the offtake is positioned so that stripping air passes through the first casing portion containing the fracture blade concurrently with movement of fractured glass particles through said first casing portion and countercurrently through the second casing portion with respect to the descent of fractured glass particulates through the second casing portion.

5. A digester for scrap fluorescent tubes comprising:
   (a) a rotatable fracture blade for impacting used fluorescent tubes to fracture said tubes into small pieces,
   (b) said rotatable fracture blade having a width not substantially greater than the diameter of the fluorescent tubes,
   (c) a casing surrounding the rotatable blade having inner dimensions not substantially greater than the outer dimensions of the rotatable blade,
   (d) a lower extension on the casing through which glass particulates may pass downwardly countercurrently with upwardly passing stripping gas,
   (e) a stripping gas takeoff intermediately positioned between a portion of the casing surrounding the fracture blade and the lower extension, and
   (f) means for drawing a substantial flow of a stripping gas through the casing during operation to strip dust and gas from residual fractured glass particulates within said casing resulting from rotation of said fracture blade against fluorescent tubes inserted into said casing.

6. A digester in accordance with claim 5 wherein the means for drawing stripping gas through the casing draws such air from the casing through a series of particulate removing apparatus.

7. A digester in accordance with claim 5 wherein the digester is arranged to pass stripping gas concurrently with fractured glass particulates through the casing surrounding the rotatable blade and countercurrently with fractured glass particulates through the lower extension of the casing.

8. A digester in accordance with claim 7 wherein the ratios of the sizes of all openings into the casing surrounding the rotatable blade, inclusive of opening a the bottom of the lower extension on the casing and the stripping gas takeoff are such that a higher velocity of gas passes countercurrently past the glass particulates than passes concurrently with such glass particulates.

9. A digester for scrap fluorescent tubes for decreasing bulk of the glass components of such tubes and allowing use of the component glass for recycling while collecting toxic dust and fumes for separate safe disposal comprising:
   (a) a fracture chamber incorporating a rotatable chopping blade,
   (b) a countercurrent flow chamber adjoining and interconnected with the bottom of the fracture chamber,
   (c) a gas take-off in the vicinity of the interconnection of the countercurrent flow chamber and the fracture chamber,
   (d) the countercurrent flow chamber being open at the lower end to an expanded particulate collection chamber,
   (e) the countercurrent flow chamber, fracture chamber, gas take-off and inlets to the fracture chamber and countercurrent flow chamber being dimensioned and interconnected such that when a suction is applied to the gas take-off, a rapid flow of gas is established through the fracture chamber and the countercurrent flow chamber, with the velocity of flow through the countercurrent flow chamber being an order of approximately one hundred times the velocity of flow through the fracture chamber.

10. A digester for scrap fluorescent tubes according to claim 9 additionally comprising:
    (f) gas movement effecting means arranged and constructed to move gas through the fracture chamber and countercurrent flow chamber respectively concurrently and countercurrently with glass particulates and powder particle at a flow rate of at least 50 to 75 feet per minute through the fracture chamber and through the countercurrent flow chamber at 6000 to 9000 feet per minute.

11. A digester for scrap fluorescent tubes according to claim 10 wherein the gas with entrained glass particulates and powder particles is passed first to a centrifugal separator followed by a filter arrangement and a mercury vapor removal apparatus.

12. A digester system for scrap fluorescent tubes for decreasing the bulk of glass components of such tubes and allowing use of the component glass for recycling while collecting toxic dust and fumes for separate safe disposal comprising:
    (a) a casing arranged and constructed for substantially surrounding and enclosing a rotatable chopping blade for fracturing used fluorescent tubes into reduced-size individual glass particulates,
    (b) an enclosed feed chute passing into the chopping blade casing, said chute having an internal diameter such as to allow free passage of used fluorescent tubes therethrough, but with a restricted clearance at least in one portion of the chute to limit air passage down the chute when a fluorescent tube is passing therethrough,
    (c) a vertically rotatable tube chopping blade having a width not substantially greater than the diameter of the feed chute positioned to intersect fluorescent tubes passing down said feed chute into said casing,
    (d) said casing extending downwardly form the rotatable tube chopping blade toward a lower particulate outlet and having restricted internal dimensions such that a substantial flow of air at least through a lower portion of the casing between the particulate outlet and the rotatable chopper blade can be maintained during chopping of fluorescent tubes,
    (e) an offtake from the casing connected to a vacuum suction system means for drawing air from the casing and into a centrifugal separator means followed by a filter and mercury absorption means,
    (f) said offtake being positioned and the vacuum system being arranged and constructed such that a rapid flow of stripping air passes through the portion of the casing surrounding the fracture blade concurrently with movement of fractured glass particles through said upper portion of the casing and countercurrently through the lower portion of the casing with the descent of fractured glass particulates through the casing after fracturing by the tube chopping blade.

13. A digester system in accordance with claim 12 wherein the offtake is positioned so the stripping air passing concurrently and countercurrently with the glass particulates meets in a central portion of the casing and is withdrawn through at least one suction means positioned substantially between an upper fracturing portion of the casing and a lower countercurrent flow portion of the casing.

14. A digester system in accordance with claim 12 wherein the offtake is positioned so the stripping air passing concurrently and countercurrently with the glass particulates meets in a central portion adjacent the interconnection of the first and second casing portions and is withdrawn through at least one suction means positioned substantially between an upper fracturing portion of the first casing portion and a lower countercurrent flow portion of the second casing portion.

15. A method of digesting used fluorescent tubes for recycling of usable components and disposal of toxic components comprising:
    (a) chopping the fluorescent tubes into small particulates with a rotating chopper blade contained in a restricted clearance casing,
    (b) drawing a stream of air through the restricted clearance casing having a volume and velocity sufficient to remove and entrain in said air stream substantially all toxic powder and fumes released from the fluorescent tubes during fracturing thereof,
    (c) passing said stream of air containing toxic powder and fumes entrained therein into a centrifugal separator to separate the majority of the toxic powder entrained in the gas stream, and
    (d) passing the stream of air from the centrifugal separator to a filter and absorption system to remove residual particulate material and any toxic fume material, and
    (e) wherein the air stream which entrains the toxic powder and fumes enters the casing from two directions in two portions, one portion of which air stream passes through a first section of the restricted clearance casing surrounding the rotating chopper blade substantially concurrently with the fractured glass particulates formed by impact with the rotating chopper blade and the other portion of which air stream passes through a second portion of the restricted clearance casing below the rotating chopper blade countercurrently with the fractured glass particulates descending through the casing.

16. A method in accordance with claim 15 wherein the air stream enters the casing from two directions one portion of which air stream passes through a first section of the restricted clearance casing surrounding the rotating chopper blade substantially concurrently with the fractured glass particulates formed by impact with the rotating chopper blade and use other portion of which air stream passes through a second portion of the restricted clearance casing below the rotating chopper blade countercurrently with the fractured glass particulates descending through the casing.

17. A method in accordance with claim 16 comprising additionally passing the two portions of the air stream toward each other and withdrawing said two portions from the casing adjacent to their projected meeting point.

18. A method in accordance with claim 17 wherein the two portions of the air stream meet at an intermediate point and are withdrawn together form the casing.

19. A method of digesting fluorescent tubes and separating residual components of said tubes comprising:
    (a) fracturing the tubes in a constricted fracturing volume with a rotating fracture blade,
    (b) passing a first rapid flow of stripping gas through the constricted fracturing volume while the tubes are being fractured into a particle size that is easily disposable in order to entrain loose powder material originally coating the inside of the tube,
    (c) passing particles of glass from the constricted fracturing volume together with entrained powder and stripping gas into a connecting constricted countercurrent gas stripping zone in opposition to a second rapid flow of stripping gas passing upwardly countercurrent to passage of the particles of glass,
    (d) removing said first and second rapid flows of gas simultaneously from a point where the constricted fracturing volume and the connected constricted countercurrent gas stripping zone interconnect, and
    (e) passing the rapid flows of gas as a combined flow through a series of powder removal devices to remove entrained powder from the combined gas flow.

20. A method of digesting in accordance with claim 19 wherein the rapid gas flow through the fracturing zone has a velocity of at least 50 to 75 feet per minute.

21. A method of digesting in accordance with claim 20 wherein the gas velocity through the fracturing zone is at least 100 to 200 feet per minute.

22. A method of digesting in accordance with claim 19 wherein the velocity of the second rapid flow of countercurrent stripping gas is from 6000 to 9000 feet per minute through the constricted countercurrent flow zone.

23. A method of digesting in accordance with claim 22 wherein the velocity of the second rapid flow of countercurrent stripping gas is approximately 6200 feet per minute plus or minus ten percent.

24. A method of digesting in accordance with claim 23 wherein the velocity of the rapid gas flow through the fracturing zone is from 100 to 200 feet per minute.

25. A method of digesting used fluorescent tubes and separating the components of the tubes comprising:
    (a) passing a fluorescent tube into a constricted fracturing chamber where the tube is fractured into separate pieces by contact with a rotating fracturing blade,
    (b) drawing a first stream of air through said fracturing chamber substantially concurrently with the passage through and from said chamber of fractured glass particulates, the stream of air having a sufficient flow to entrain powder derived from powder deposits adherent to the inside of the unfractured tube, which powder becomes separated from the glass and glass particulates during fracturing and upon exposure of the glass particulates to the rapid flow of gas, and to prevent buildup of particulate and powder deposits in the fracturing chamber,
    (c) passing the glass particulates substantially downwardly into a second stream of air passing countercurrently with the glass particulates and having a countercurrent velocity sufficient to strip loose powder from original internal surface portions of the glass particulates and carry the powder upwardly, but insufficient to carry the majority of the glass particulates upwardly, (d) passing the first and second streams of air to a particulate removal arrangement to remove particulates of powder and small glass particles from the air streams.

26. A method of digesting and separating in accordance with claim 25 wherein the first and second air streams are united into a single air stream before being passed to the particulate removal arrangement.

27. A method of digesting and separation in accordance with claim 26 wherein the particulate removal arrangement includes at least one centrifugal particulate removal operation as well as filtering and metallic vapor removal operations.

28. A method of digesting used fluorescent tubes for recycling of usable components and disposal of toxic components comprising:
   (a) chopping the fluorescent tubes into small particulates with a rotating chopper blade contained in a first restricted clearance casing,
   (b) drawing a first stream of air through the first restricted clearance casing having a volume and velocity sufficient to remove and entrain in said air stream substantially all toxic powder and fumes released from the fluorescent tubes during fracturing thereof,
   (c) passing fractured glass particulates from said first restricted clearance casing generally downwardly into a second interconnected casing having restricted dimensions such that the longitudinal dimension of the second casing is at least several times the transverse dimension of said second casing,
   (d) drawing a second stream of generally vertically moving air through the second casing having a volume and velocity sufficient to remove and entrain in the air substantially all remaining toxic powder and fumes released from the fractured glass,
   (e) passing said streams of air containing toxic powder and fumes entrained therein into a centrifugal separator to separate the majority of the particulate matter entrained in the gas stream, and
   (f) passing the stream of air from the centrifugal separator to a filter and absorption system to remove residual particulate material and any toxic fume material.

29. A method in accordance with claim 28 wherein the air flow through the second casing is countercurrent with the passage of the fractured glass.

30. A method in accordance with claim 29 wherein the air stream enters the first and second casings from two directions, one portion of which air stream passes through the first casing in the restricted clearance surrounding the rotating chopper blade substantially concurrently with the fractured glass particulates formed by impact with the rotating chopper blade and the other portion of which air stream passes through the second casing in the restricted clearance therein countercurrently with the fractured glass descending through the second casing.

31. A method in accordance with claim 30 comprising additionally passing the two portions of the air stream toward each other and withdrawing said two portions from the casing adjacent to their projected meeting point.

32. A method in accordance with claim 31 wherein the two portions of the air stream meet at an intermediate point and are withdrawn together form the first and second casings.

* * * * *

UNITED STATES PATENT AND TRADEMARK OFFICE
CERTIFICATE OF CORRECTION

PATENT NO. : 5,092,527
DATED : March 3, 1992
INVENTOR(S) : Timothy J. Perry, Frederick Bryant It is certified that error appears in the above-identified patent and that said Letters Patent is hereby corrected as shown below:

Column 6, line 27, "equiped" should read --equipped--.

Column 8, line 18, "eve" should read --even--.

Column 10, line 34, "0" should read --or--.

Column 15, line 45, "particules" should read --particles--.

Column 17, Claim 8, line 45, "a" should read --at--.

Column 19, Claim 18, line 66, "form" should read --from--.

Signed and Sealed this

Twenty-seventh Day of September, 1994

Attest:

BRUCE LEHMAN

Attesting Officer

Commissioner of Patents and Trademarks